(12) United States Patent
Kennedy et al.

(10) Patent No.: US 7,190,348 B2
(45) Date of Patent: Mar. 13, 2007

(54) METHOD FOR TOUCHSCREEN DATA INPUT

(75) Inventors: Peter J. Kennedy, Durham, NC (US); James R. Lewis, Delray Beach, FL (US); David Sawin, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 09/749,480

(22) Filed: Dec. 26, 2000

(65) Prior Publication Data

US 2002/0080123 A1 Jun. 27, 2002

(51) Int. Cl.
*G06G 5/00* (2006.01)

(52) U.S. Cl. .................... 345/168; 345/179; 178/18.01

(58) Field of Classification Search ................ 345/173, 345/174, 179; 178/18.01, 18.03, 18.04, 19.01, 178/19.02, 19.03, 19.04, 19.05, 18.06
See application file for complete search history.

(56) References Cited

U.S. PATENT DOCUMENTS

| | | | | |
|---|---|---|---|---|
| 4,868,912 A | * | 9/1989 | Doering | 345/175 |
| 5,270,711 A | * | 12/1993 | Knapp | 341/34 |
| 5,386,219 A | * | 1/1995 | Greanias et al. | 345/174 |
| 5,677,710 A | * | 10/1997 | Thompson-Rohrlich | 345/173 |
| 5,777,607 A | * | 7/1998 | Koolen | 345/174 |
| 5,945,980 A | * | 8/1999 | Moissev et al. | 345/173 |
| 5,956,020 A | * | 9/1999 | D'Amico et al. | 345/173 |
| 6,029,214 A | * | 2/2000 | Dorfman et al. | 710/73 |
| 6,054,979 A | * | 4/2000 | Sellers | 345/173 |
| 6,323,846 B1 | * | 11/2001 | Westerman et al. | 345/173 |
| 6,340,967 B1 | * | 1/2002 | Maxted | 345/179 |
| 6,411,283 B1 | * | 6/2002 | Murphy | 345/173 |
| 6,492,979 B1 | * | 12/2002 | Kent et al. | 345/173 |
| 2002/0025837 A1 | * | 2/2002 | Levy | 455/566 |
| 2002/0175901 A1 | * | 11/2002 | Gettemy | 345/175 |
| 2003/0067447 A1 | * | 4/2003 | Geaghan et al. | 345/173 |

* cited by examiner

*Primary Examiner*—Richard Hjerpe
*Assistant Examiner*—Kimnhung Nguyen
(74) *Attorney, Agent, or Firm*—Akerman Senterfitt

(57) ABSTRACT

A method and system for use with a computer based system having a touchscreen for distinguishing between a finger and a stylus. The method involves a series of steps including detecting contact with the touchscreen. Also, the method can include generating contact information for the detected contact with the touchscreen. The method includes comparing contact information corresponding to the detected contact with contact criteria, and, based on the comparison of the contact information, determining whether the contact was initiated by a finger or a stylus.

19 Claims, 2 Drawing Sheets

METHOD FOR TOUCHSCREEN DATA INPUT

BACKGROUND OF THE INVENTION

1. Technical Field

This invention relates to computer pointer control, and more particularly, to distinguishing between different pointing devices for use with a touchscreen.

2. Description of the Related Art

Computer based devices utilizing touchscreen technology have become commonplace in many facets of life. Examples can include personal digital assistants (PDAs) such as the Palm Pilot, available from Palm Computing, Inc., of Santa Clara, Calif., and computer driven kiosks for dispensing information to shoppers and other consumers. Presently, computer based devices incorporating touchscreen technology process stylus contact with a touchscreen in the same manner as finger contact with a touchscreen. For example, such computer-based devices do not distinguish a user's finger from a stylus when determining the location in the touchscreen where the contact occurred. Additionally, in the case of multiple touchscreen contacts, such computer based devices do not distinguish a finger from a stylus, particularly in regard to touchscreen parameters of duration and control.

The inability to distinguish between contact originating from a user's finger and contact originating from a stylus can be problematic. Specifically, different procedures can be used to emulate realtime on-screen pointer or cursor control based upon whether the system is to be used with a finger or a stylus. These differing procedures are largely an outgrowth of the differing physical properties associated with a stylus and a finger. One such physical property is the size of the contact area between a user's finger and the touchscreen, which is significantly larger than the contact area between a touchscreen and a stylus.

One disadvantage caused by the physical size of a finger is that the finger can obscure the view of controls displayed in the touchscreen. This is especially true of realtime on-screen pointer control systems where a finger placed upon the touchscreen can obscure the on-screen pointer. Another disadvantage caused by the size of a finger is that the selection of usually displayed objects in the touchscreen can be inexact. Specifically, although the touchscreen can detect a larger contact area, the contact is treated no differently than a stylus. Consequently, selection of objects with pixel accuracy can be cumbersome due to the large contact area resulting from finger contact with a touchscreen. Additionally, minute and unintentional movements of a finger can result in erratic movement of the on-screen cursor.

Several solutions have been developed to address the problems associated with finger initiated contact with a touchscreen as it relates to realtime on-screen pointer control. One such solution is the cursor offset solution, where the cursor is relocated a particular distance away from the detected contact point with the touchscreen. This enables the user to maintain an unobscured view of the cursor. Additionally, the visual feedback aids the user in controlling the realtime on-screen cursor.

Another solution for dealing with finger initiated contact with a touchscreen is the pause strategy. The pause strategy involves detecting a contact with a touchscreen. The contact duration is calculated to determine whether the contact was intentional. For example, contacts having a duration less than a particular threshold period of time can be interpreted as accidental. Contacts having a duration within a mid-range period of time can be interpreted as a single-click event. Two detected contacts of a particular duration occurring within a particular time frame can be interpreted as double-click events.

Still the aforementioned solutions can be ineffective because such solutions can be utilized only if a design was intended to function with finger contact rather than stylus contact. This result is primarily because the strategies for finger contact with a touchscreen hinder the simpler interaction afforded by the more precise stylus. Presently, touchscreen systems are unable to distinguish between a contact initiated by a finger and a contact initiated by a stylus. Consequently, present systems do not allow a user to freely alternate between using a stylus and a finger as a pointing device with a touchscreen.

SUMMARY OF THE INVENTION

The invention concerns a method and a system for distinguishing between finger contact and stylus contact with a touchscreen. The method and system of the invention can be used in cooperation with realtime on-screen cursor control in a computing environment. The invention can distinguish between a finger contact and a stylus contact with a touchscreen by comparing information corresponding to the contact with contact criteria.

The inventive method taught herein can begin by detecting contact with the touchscreen. The method can include generating contact information for the detected contact with the touchscreen. Contact information corresponding to the detected contact can be compared with contact criteria. Notably, the contact criteria can include a threshold value for comparing the contact information. Based on the comparing of the contact information with the contact criteria, the additional step of determining whether the contact was initiated by a finger or a stylus can be included.

The determining step of the method can be interpreting the detected contact as a finger contact for the contact information consistent with contact criteria corresponding to finger contact. For contact determined to be finger contact, the method can include offsetting an on-screen pointer a predetermined distance from the detected contact. Further, the method can include detecting the duration of the contact and the duration between the contact and a second contact. Alternatively, the determining step of the method can be interpreting the detected contact as a stylus contact for the contact information consistent with contact criteria corresponding to stylus contact. In that case, the method can include displaying an activated point in the touchscreen beneath the detected contact. The method also can include converting pointer control information to text. Additionally, the method can include presenting a visual interface in a touchscreen suited to finger contact or stylus contact based on the determining step.

In another embodiment of the invention, the method can include detecting contact with the touchscreen and generating contact information for the detected contact with the touchscreen. Additionally, the method can include comparing contact information corresponding to the detected contact with contact criteria. Based on the comparison of the contact information with the contact criteria, the method can include determining whether the contact was initiated by a finger or a stylus.

For the contact information consistent with contact criteria corresponding to finger contact, the method can include interpreting the detected contact as a finger contact. For finger contact, the method can include offsetting an on-screen pointer a predetermined distance from the detected contact, detecting the duration of the contact, and detecting the duration between the contact and a second contact. Alternatively, the method can include interpreting the detected contact as a stylus contact for the contact information consistent with contact criteria corresponding to stylus contact. In that case, the step of displaying an activated point in the touchscreen beneath the detected contact can be included.

Another aspect of the invention can be a machine readable storage, having stored thereon a computer program having a plurality of code sections executable by a machine for causing the machine to perform a series of steps. The steps can include detecting contact with the touchscreen, and generating contact information for the detected contact with the touchscreen. The machine readable storage can cause the machine to perform the step of comparing contact information corresponding to the detected contact with contact criteria, which can include a threshold value for comparing contact information. Based on the comparison of the contact information with the contact criteria, the additional step of determining whether the contact was initiated by a finger or a stylus can be performed.

The machine readable storage can cause the machine to perform the additional step of interpreting the detected contact as a finger contact for the contact information consistent with contact criteria corresponding to finger contact. For finger contact, the steps of offsetting an on-screen pointer a predetermined distance from the detected contact, detecting the duration of the contact, and detecting the duration between the contact and a second contact can be included. Alternatively, the additional step can be interpreting the detected contact as a stylus contact for the contact information consistent with contact criteria corresponding to stylus contact. For stylus contact, the steps of displaying an activated point in the touchscreen beneath the detected contact, and converting pointer control information to text can be included. The machine readable storage further can cause the machine to perform the step of presenting a visual interface in the touchscreen corresponding to finger contact or stylus contact based on the determining step.

BRIEF DESCRIPTION OF THE DRAWINGS

There are shown in the drawings embodiments which are presently preferred, it being understood, however, that the invention is not so limited to the precise arrangements and instrumentalities shown, wherein.

DETAILED DESCRIPTION OF THE INVENTION

Figure 1:
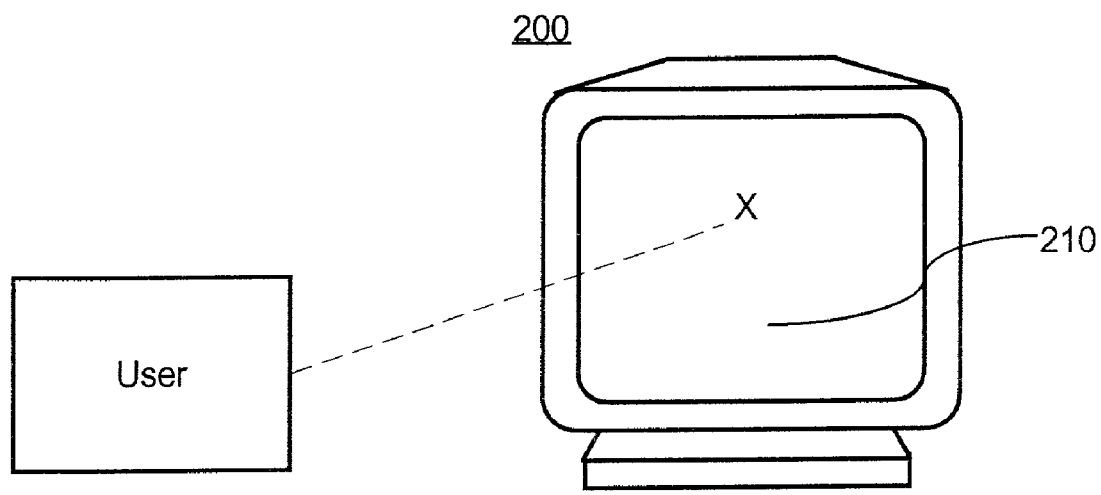
FIG. 1 depicts an exemplary configuration utilizing the system of the invention.

The invention provides a method and system for distinguishing between the touch of a finger and a stylus with a touchscreen. The system of the invention (detection system) can be utilized within a touchscreen or touchscreen system. Further, the detection system can be used within touchscreen systems incorporating realtime on-screen cursor control in a computing environment. For example, the system can be used within or in combination with a Microsoft Windows® environment.

The detection system can detect contact with a touchscreen. The contact can be initiated with either a stylus or a finger. Upon detection of a contact with the touchscreen, the touchscreen can generate contact information corresponding to the contact. Contact information can include characteristics corresponding to the size of a detected contact with the touchscreen, the contact location, duration, pressure, and the frequency of multiple contacts with touchscreen. The touchscreen can send the contact information to the detection system indicating contact. Notably, the information sent by the touchscreen can be in the form of a software event containing parameters corresponding to the contact detected by the touchscreen. The information also can be sent by messaging or by directing the information to the detection system. For example, the contact information can be sent through a continuous stream of digital data using a communications protocol specified by the touchscreen for communicating the aforementioned parameters. Contact information also can be sent in analog form where contact information can be represented using voltages or currents.

Contact size information can be expressed as a single value representative of the contact area or width. For example, the size parameter can be expressed as a number of pixels corresponding to either the area or the width of the detected contact. Alternatively, the size information can be represented using other units of measurement, such as millimeters and centimeters for widths, and square millimeters and square centimeters for areas. Because touchscreens can incorporate electrical touch sensing circuits beneath the touchscreen display, where current flow or increased current flow at a node of the circuit can represent contact with the touchscreen, another unit of measurement can be nodes of the electrical touch sensing circuits. Thus, contact size can be denoted using a number of nodes having current flow or increased current flow representing an area or a width of the contact.

Notably, the detection system can receive size information as a series of single values, each corresponding to a location where contact was detected. In that case the values can correspond to activated circuit nodes, pixels, or X-Y coordinates. Thus, the detection system can count the number of received touchscreen locations where contact was detected to determine contact size information. The detection system can count the total number of nodes for a detected contact, or alternatively, count the nodes until a threshold value is reached. In that case, the system need not determine an actual width or area measurement, but rather determine that the count is greater than or equal to the threshold value.

The detection system can compare contact information with contact criteria to determine whether the detected contact was initiated by a finger or a stylus. The contact criteria can contain a preset size parameter, which can be a threshold value. Notably, the threshold value can represent an area or a width to which contact size information can be compared. For example, based on whether the size of the detected contact is greater than, less than, or equal to the preset size parameter, the system can distinguish between finger and stylus contact. The meaning and unit of the preset size parameter can vary with the manner in which the touchscreen detects contact and communicates contact information. For example, the preset size parameter can represent a voltage, a current, an area measurement or count, a width measurement or count, or a number of circuit nodes or pixels.

For example, regardless of the unit of the preset size parameter, if the value corresponding to the size of a detected contact is greater than or equal to the preset size parameter, the system can interpret the contact as a finger contact. Alternatively, if the value corresponding to the size of a detected contact is less than the preset size parameter, then the system can interpret the contact as stylus contact. It should be appreciated that the invention is not so limited to the example disclosed, and the contact criteria can contain several preset size parameter values such that contact size information can be compared against ranges of preset size parameter values denoting stylus, finger, or accidental contact.

Notably, both detected finger actions and stylus actions can be processed to derive pointer control information. If the detected contact is interpreted as a finger contact, the system can relocate the on-screen pointer a predetermined distance from the location where contact was detected with the touchscreen. Cursor offset provides the user a view of the touchscreen unobscured by the user's finger. For example, the detection system can relocate the pointer a distance of approximately 1 to 2 millimeters above the detected contact. Notably, the distance can be a user-adjustable detection system parameter. Regardless of how the offset is accomplished, the preset distance can be measured in millimeters, centimeters, inches, or pixels. Any suitable unit of measurement for measuring distance upon a touchscreen can be used.

The pause strategy also can be applied to finger contact with touchscreens. The pause strategy involves detecting a contact with a touchscreen. The contact duration is calculated to determine whether the contact was intentional. For example, contacts having a duration less than a particular threshold period of time can be interpreted as accidental. Contacts having a duration within a mid-range period of time can be interpreted as a single-click event. Two detected contacts of a particular duration occurring within a particular time frame can be interpreted as double-click events.

The detection system also can implement different visual interfaces in the touchscreen for finger contact. For example, the detection system can provide feedback to an application program which can change display interfaces based on the type of contact detected. Visual interfaces for finger contact can include larger on-screen controls such as buttons, scroll bars, and other icons. For example, for finger contact, the detection system can display a different visual interface for a user having controls more suited to finger contact. These controls can be larger, and thus easier to manipulate using a finger. Due to the larger user interface controls, less information can be provided to the user within a single screen. Thus, a larger number of screen displays can be utilized. For example, in a touchscreen system for use in a fast food restaurant, upon detecting a finger contact, the system can display large icons for "Sandwiches", "Salads", and "Drinks". Selection of one of the menu items can cause a further display to appear providing options for the aforementioned selections. Thus, selection of "Sandwiches" can result in the following large icons being displayed "Hamburger", "Hotdog", and "Chicken". In this manner, the detection system can automatically tailor the visual display and computing environment through which the user interacts for finger contact. Notably, the aforementioned procedures for dealing with finger initiated contact with a touchscreen are presently known in the art.

If the detected contact is interpreted as a stylus contact, the detection system can place the on-screen pointer at the location where contact with the touchscreen is detected. The detection system can cause the activated point in the touchscreen to be a location beneath the stylus tip. Notably, the activated point in the touchscreen can be observed by the user and not significantly obscured by the stylus. The detection system also can enable handwriting recognition software for recognizing stylus actions on the touchscreen. Thus, upon detecting stylus contact, the detection system can provide pointer control events to a handwriting recognition system for converting user stylus actions to text.

The detection system can also implement different visual interfaces in the touchscreen for stylus contact. For example, the detection system can provide feedback to an application program which can change display interfaces based on the type of contact detected. Visual interfaces for stylus contact can include smaller on-screen controls such as buttons, scroll bars, and other icons. Additional features such as handwriting recognition can be enabled. For example, for stylus contact, the detection system can display a different visual interface for a user having controls suited to stylus contact. These controls can be smaller, enabling more information to be displayed upon the touchscreen. Taking the previous example, the system can display "Sandwiches", "Salads", and "Drinks". Because the items can be smaller than for finger contact, submenus can be displayed beneath the choices. For example, beneath "Sandwiches", the detection system can display "Hamburger", "Hotdog", and "Chicken". In this manner, the detection system can automatically tailor the visual interface and computing environment through which the user interacts.

FIG. 1 depicts an exemplary configuration utilizing the system of the invention. In FIG. 1, a user can interact with a touchscreen system 200. Accordingly, the user initiates contact with a touchscreen 210 using either a finger, or alternatively, a stylus. The contact with touchscreen 210 initiated by either the finger or the stylus is denoted in the figure with an "X".

Figure 2:
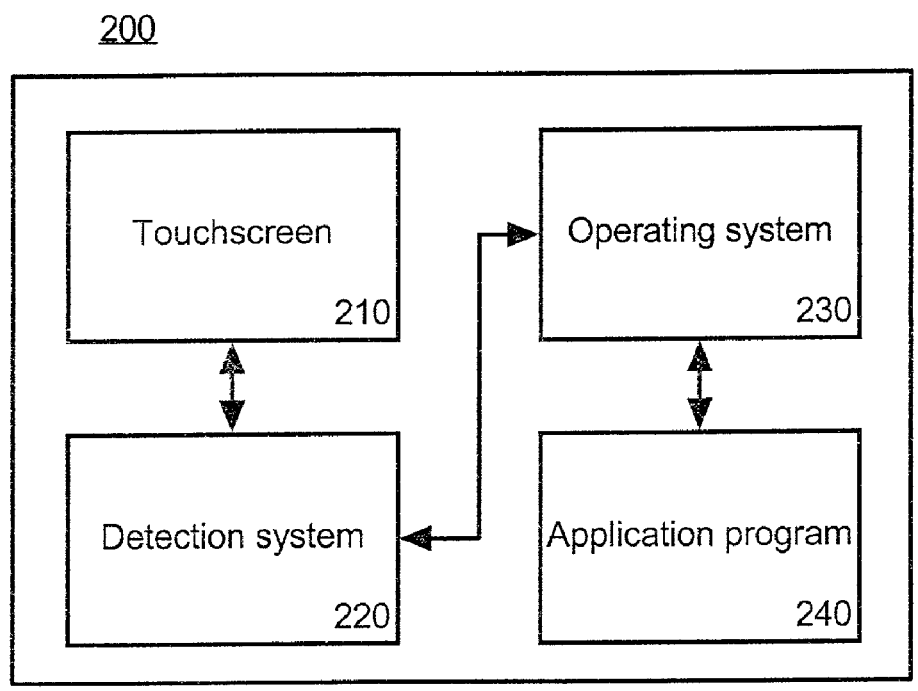
FIG. 2 is a schematic diagram illustrating an exemplary system for distinguishing between a finger and a stylus.

FIG. 2 depicts exemplary touchscreen system 200 containing a touchscreen 210, detection system 220, operating system 230, and application program 240. System 200 can be any computer system wherein a touchscreen is incorporated such that interaction with the touchscreen can be initiated with a finger or a stylus.

Touchscreen 210 can be any of a variety of touchscreens commonly known in the art. A suitable touchscreen can include any touchscreen capable of communicating information to a computing device corresponding to the size of a contact between a contact implement, such as a finger or a stylus, and a touchscreen. An example of such a touchscreen can be the ClearPad™ available from Synaptics, Inc., of San Jose, Calif., which can communicate a width parameter for a contact with the touchscreen. Further examples can include other touchscreens for use with a passive stylus or finger, such that the touchscreen can generate information relating to the size of a contact with the touchscreen. For example, touchscreens using an electrical touch sensing circuit, capable of communicating multiple circuit locations where contact is detected, can be used. Current flow or increased current flow through one or more nodes of the electrical touch sensing circuit can indicate size information of a contact with the touchscreen.

Detection system 220, operating system 230, and application program 240 can be computer programs written in C or another suitable programming language. Although the programs are shown as separate application programs, it should be appreciated that the programs can exist as a single program, or in any combination thereof. For example, in one embodiment, detection system 220 can be a driver program for touchscreen 210 thereby cooperatively interacting with touchscreen 210, operating system 230, and application program 240. Alternatively, detection system 220 can be implemented as hardware within touchscreen 210. In that case, touchscreen 210 can provide signaling information to detection system 220, wherein detection system 220 can include appropriate digital logic or analog circuitry. The circuitry within detection system 220 can appropriately decode and alter the received information and subsequently make the information available to operating system 230 for further use by application program 240. In either case, the detection system 220 can conform the contact information to realtime on-screen pointer control events, and provide the resulting events to operating system 230. Additionally, detection system 220 can provide information to operating system 230 and application program 240 indicating whether a stylus or a finger is being used with the touchscreen 210.

The computer programs can be contained within touchscreen system 200 equipped with the necessary computer hardware. Notably, touchscreen 210 can be incorporated within a computer system, or alternatively, exist as an independent component operatively connected to a separate computer system. Moreover, detection system 220 can exist within touchscreen 210, or in the case of a separate computer system connected to an independent touchscreen 210, within the computer system. The various hardware requirements for the computer system as described herein can generally be satisfied by any one of many commercially available high speed multimedia personal computers offered by manufacturers such as International Business Machines Corporation.

In operation, a user can initiate contact with touchscreen 210 with either a stylus or a finger. Touchscreen 210 can detect such contact with the touchscreen and send contact information to detection system 220. Notably, the contact information can include characteristics corresponding to the size of the contact with the touchscreen 210, the contact location, duration, and the frequency of multiple contacts with touchscreen 210.

Detection system 220 automatically can examine the information received from touchscreen 210 to determine whether the contact was initiated by either a finger or a stylus. Based on whether the contact was initiated with a finger or a stylus, detection system 220 can implement one or more procedures for emulating realtime on-screen cursor control. These procedures can include the pause strategy, relocating the on-screen pointer, displaying an activated point on the touchscreen beneath the detected contact, enabling handwriting recognition software, and presenting a user interface tailored to either a finger or a stylus. After implementation of one or more of the aforementioned procedures, the detection system 220 further can provide information to operating system 230 and application program 240 for emulating realtime on-screen cursor or pointer control. Notably, application program 240 can perform handwriting recognition functions for the touchscreen system 200.

Figure 3:
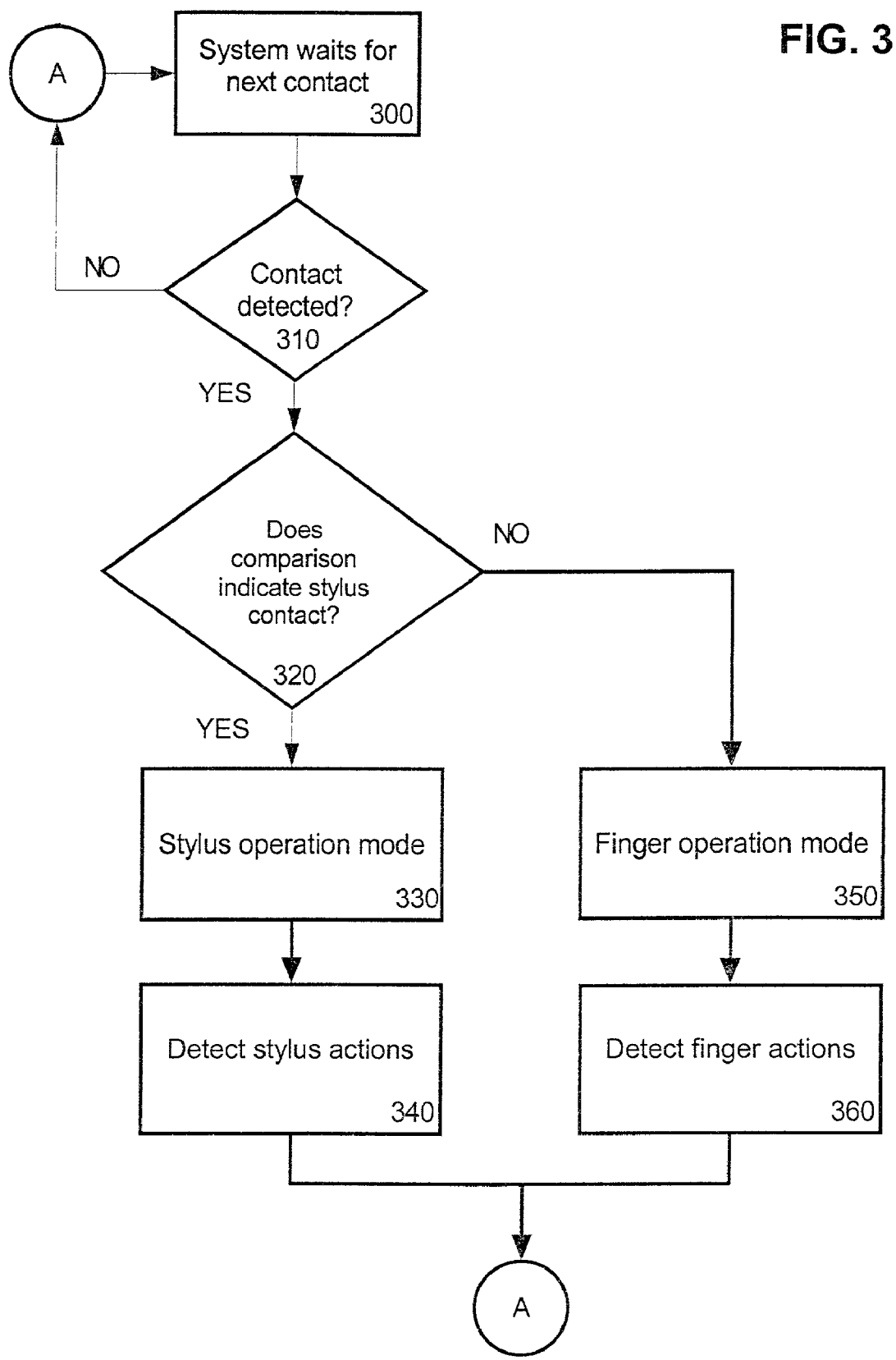
FIG. 3 is a flow chart illustrating a process for distinguishing between a finger and a stylus.

FIG. 3 illustrates a process for distinguishing between a finger and a stylus as performed by detection system 220 in the exemplary system of FIG. 2. According to one embodiment of the invention, the detection system can be placed in a state awaiting a contact with the touchscreen. Accordingly, FIG. 3 begins at step 300 where the detection system awaits a contact with the touchscreen. If no contact is detected with the touchscreen, the system can continually loop between steps 300 and 310 until a contact is detected by the detection system. Once a contact is detected, the detection system can proceed to step 320. For example, upon a user initiated contact with either a stylus or a finger with the touchscreen, the touchscreen can send information to the detection system indicating contact. The information sent by the touchscreen can be in the form of a software event containing parameters corresponding to the contact detected by the touchscreen. The information also can be sent by messaging or directing the information to the detection system. The parameters contained in the information can include, but are not limited to, pressure or force of the contact, the area of the contact, the duration of the contact, the frequency of multiple contacts, and the location of the contact with the touchscreen. Thus, the detection system can loop until an event or message is received indicating contact with the touchscreen. After detection of a contact, the detection system can continue to step 320.

In step 320, the detection system can compare the received contact information, particularly contact size information, to the contact criteria. The comparison can determine whether the size of the contact is greater than, less than, or equal to a preset size parameter. For example, in one embodiment, the information sent from the touchscreen can include size information corresponding to the contact area or width. The system can be programmed such that contacts with the touchscreen having widths or areas less than the preset size parameter can be interpreted as stylus contact. Using area as an example, areas measuring less than 1.5 $mm^2$ can be interpreted as being initiated by a stylus. Notably, a stylus can have a contact area with a touchscreen of approximately 1 to 1.5 $mm^2$, whereas a finger can have a significantly larger contact area with a touchscreen of approximately 4 $mm^2$. The same procedure can be implemented using width rather than area. Any of the aforementioned methods of representing contact size can be used.

In another embodiment, the touchscreen can serially provide the detection system with a listing of locations upon the touchscreen, such as pixels, electrical grid nodes, or X-Y coordinates, where contact was detected. In this case, the touchscreen can determine an area measurement by identifying adjacent locations upon the touchscreen where contact was detected within a particular time frame. The detection system can continue to count contact locations received serially. In this manner, when the count becomes equal to the preset size parameter within the particular time frame, the system can determine the contact to be a finger contact. Alternatively, if the count is less than the preset size parameter at the expiration of the time frame, the contact can be determined to be stylus contact. For example, due to the physical characteristics of a finger, and the irregular motion by which the finger makes contact with the touchscreen, each location detecting a contact may not be triggered at the same moment in time. This can occur if the finger is non-uniformly pressed against the touchscreen. Thus, a time frame for detecting contact can accommodate the physical characteristics of a finger, while not being disadvantageous to detecting a stylus. In another embodiment, the detection system can determine a contact size measurement. In that case, the detection system can receive each of a series of touchscreen locations detecting contact within the particular time frame to determine an area or width measurement for comparison to the preset size parameter. Measurements less than the preset size parameter can correspond to stylus contacts; and measurements greater than or equal to the preset size parameter can correspond to finger contacts. If comparison of contact information with the contact criteria indicates a stylus, the system can continue to step 330. If a finger is detected, the system can continue to step 350.

Proceeding with step 330, the detection system has determined that the touchscreen contact was initiated by a stylus. Consequently, the detection system can be placed into a stylus operation mode. In stylus operation mode the detection system can cause the activated point in the touchscreen to be a location beneath the stylus tip. Additionally, the detection system can cause a visual interface suited for stylus contact with a touchscreen to be displayed. As mentioned, the detection system can provide information to the operating system or an applications program indicating stylus contact. Accordingly, the visual interface suited for stylus user interaction can be presented. After the detection system enters stylus operation mode, the system can continue to step 340.

In step 340, the detection system can detect stylus actions with the touchscreen for translation into realtime on-screen pointer events. Such techniques presently are known in the art. For example, the detection system can detect stylus actions corresponding to mouse events such as single-clicks, double-clicks, no event, and target dragging operations. Additionally, by determining that contact with the touchscreen was initiated by a stylus, the detection system can enable a handwriting recognition application. In that case, stylus actions conforming to pointer control events can be provided to a handwriting recognition system for conversion into text. After completion of step 340, the detection system proceeds to jump circle A to begin the process anew.

If the comparison step of 320 indicated a finger contact, then the system can continue to step 350. In step 350, the detection system can be placed in finger operation mode for implementation of several procedures for dealing with finger initiated contact with the touchscreen. These procedures can include the pause strategy and offsetting the realtime on-screen pointer a predetermined distance from the detected contact with the touchscreen, as previously mentioned. Additionally, the detection system can provide information to the operating system or an application program indicating finger contact. Accordingly, the visual interface suited for finger interaction can be presented in the touchscreen. After completion of step 350, the detection system can proceed to step 360.

In step 360, the detection system can detect finger actions with the touchscreen for translation into realtime on-screen pointer control events. Such techniques presently are known in the art. For example, the detection system can detect finger actions corresponding to mouse events such as single-clicks, double-clicks, no event, and target dragging operations. Thus, by determining that contact with the touchscreen was finger contact, the detection system can implement one or more procedures for translation of finger actions with a touchscreen to realtime on-screen pointer control events. After completion of step 360, the detection system can proceed to jump circle A to begin the process anew.

The present invention can be realized in hardware, software, or a combination of hardware and software. A method and system for automatically distinguishing between a finger or stylus initiated contact according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. In a computer based system having a touchscreen, a method comprising:
    detecting contact with said touchscreen;
    implementing a visual interface within said touchscreen in response to detecting contact;
    generating contact information specifying a size of said detected contact with said touchscreen;
    comparing said contact information with contact criteria;
    based on said comparing of said contact information, interpreting the detected contact as finger contact and configuring the visual interface for finger contact when said contact information is consistent with contact criteria corresponding to a finger contact; and,
    based on said comparing of said contact information, offsetting an on-screen pointer a distance from said detected contact, wherein the distance is based upon the size of said detected contact, wherein the distance from said detected contact varies as the size of said detected contact varies.

2. The method of claim 1, wherein said determining step comprises:
    for said contact information consistent with said contact criteria corresponding to a stylus contact, interpreting said detected contact as stylus contact; and
    responsive to said determining step determining a stylus contact, automatically enabling handwriting recognition software.

3. The method of claim 2, further comprising:
    displaying an activated point in said touchscreen beneath said detected contact.

4. The method of claim 2, further comprising:
    converting pointer control information to text.

5. The method of claim 1, further comprising:
    detecting duration of said contact to determine whether said contact was intentional.

6. The method of claim 1, further comprising:
    detecting the duration between said contact and a second contact; and
    determining an occurrence of a double-click event based upon whether said contact and said second contact are each of a particular duration and whether said contact and said second contact occur within a particular time frame of each other.

7. The method of claim 1, further comprising:
    based on said determining step, presenting a visual interface in said touchscreen corresponding to finger contact or a visual interface in said touchscreen corresponding to stylus contact based on the size of the detected contact.

8. The method of claim 1, further comprising:
    performing at least one programmatic action according to said determining step; and
    based on said comparing of said contact information, determining a contact type from a set of contact types including a finger contact, a stylus contact, and an accidental contact, wherein contact criteria contain preset parameters for each of the contact types in said set.

9. The method of claim 1, wherein the touchscreen is based upon a pressure stimuli, and wherein the detecting step is dependent in part upon an amount of pressure applied to the touchscreen.

10. A machine readable storage, having stored thereon a computer program having a plurality of code sections executable by a machine for causing the machine to perform the steps of:
  detecting contact with said touchscreen;
  implementing a visual interface within said touchscreen in response to detecting contact;
  generating contact information specifying a size of said detected contact with said touchscreen;
  comparing said contact information with contact criteria;
  based on said comparing of said contact information, interpreting the detected contact as finger contact and configuring the visual interface for finger contact when said contact information is consistent with contact criteria corresponding to a finger contact; and,
  based on said comparing of said contact information, offsetting an on-screen pointer a distance from said detected contact, wherein the distance is based upon the size of said detected contact, wherein the distance from said detected contact varies as the size of said detected contact varies.

11. The machine readable storage of claim 10, further causing the machine to perform the step of:
  for said contact information consistent with said contact criteria corresponding to a stylus contact, interpreting said detected contact as stylus contact; and
  responsive to said determining step determining a stylus contact, automatically enabling handwriting recognition software.

12. The machine readable storage of claim 11, further causing the machine to perform the step of:
  displaying an activated point in said touchscreen beneath said detected contact.

13. The machine readable storage of claim 11, further causing the machine to perform the step of:
  converting pointer control information to text.

14. The machine readable storage of claim 10, further causing the machine to perform the step of:
  detecting duration of said contact to determine whether said contact was intentional.

15. The machine readable storage of claim 10, further causing the machine to perform the step of:
  detecting the duration between said contact and a second contact; and determining an occurrence of a double-click event based upon whether said contact and said second contact are each of a particular duration and whether said contact and said second contact occur within a particular time frame of each other.

16. The machine readable storage of claim 10, further causing the machine to perform the step of:
  based on said determining step, presenting a visual interface in said touchscreen corresponding to a finger contact or a visual interface in said touchscreen corresponding to a stylus contact.

17. The machine readable storage of claim 10, further causing the machine to perform the step of performing at least one programmatic action according to said determining step; and
  based on said comparing of said contact information, determining a contact type from a set of contact types including a finger contact, a stylus contact, and an accidental contact, wherein contact criteria contain preset parameters for each of the contact types in said set.

18. The machine readable storage of claim 10, wherein the touchscreen is based upon a pressure stimuli, and wherein the detecting step is dependent in part upon an amount of pressure applied to the touchscreen.

19. In a computer based system having a touchscreen, a method for distinguishing between a finger and a stylus comprising:
  detecting contact with said touchscreen;
  generating contact information specifying a size of said detected contact with said touchscreen;
  comparing said contact information corresponding to said detected contact with contact criteria;
  based on said comparing of said contact information and the size of said detected contact, determining whether said contact was initiated by a finger or a stylus;
  for said contact information consistent with said contact criteria corresponding to said finger contact, interpreting said detected contact as a finger contact;
  for said contact information consistent with said contact criteria corresponding to finger contact, interpreting said detected contact as a finger contact and displaying an activated point in said touchscreen beneath said detected contact; and
  for said contact information consistent with said contact criteria corresponding to finger contact, offsetting an on screen point a distance from said contact point such that the distance varies depending on the size of said detected contact.

* * * * *